(12) United States Patent
Gaudinat et al.

(10) Patent No.: US 10,068,732 B2
(45) Date of Patent: Sep. 4, 2018

(54) PYROTECHNIC CIRCUIT BREAKER

(71) Applicant: Autoliv Development AB, Vargarda (SE)

(72) Inventors: François Gaudinat, Amblainville (FR); Alain Magne, Andresy (FR); Philippe Jacquot, Le Blanc Mesnil (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/227,538

(22) Filed: Aug. 3, 2016

(65) Prior Publication Data

US 2016/0343524 A1 Nov. 24, 2016

Related U.S. Application Data

(63) Continuation of application No. PCT/EP2015/052277, filed on Feb. 4, 2015.

(30) Foreign Application Priority Data

Feb. 4, 2014 (FR) ...................... 14 50853

(51) Int. Cl.
*H01H 39/00* (2006.01)
*B60L 3/04* (2006.01)

(52) U.S. Cl.
CPC ............. *H01H 39/006* (2013.01); *B60L 3/04* (2013.01); *H01H 2039/008* (2013.01)

(58) Field of Classification Search
CPC ........ H01H 37/76; H01H 39/00; H01H 85/00; H01H 33/765; H01H 1/02; H01H 2009/348; H01H 33/91; H01H 33/95
(Continued)

(56) References Cited

U.S. PATENT DOCUMENTS 4,027,385 A * 6/1977 Deubel ................. H01H 11/00
                                                        200/284
5,057,810 A * 10/1991 Raudabaugh ............ H01T 1/14
                                                        337/30
(Continued)

FOREIGN PATENT DOCUMENTS

| DE | 19817133 A1 | 10/1999 |
|---|---|---|
| EP | 0359467 A2 | 3/1990 |
| FR | 2957452 A1 | 9/2011 |

OTHER PUBLICATIONS

International Search Report (in English and French) and Written Opinion of the ISA (in French) for PCT/EP2015/052277, ISA/EP, Rijswijk, NL, dated Jul. 30, 2015.

(Continued)

*Primary Examiner* — Anatoly Vortman
*Assistant Examiner* — Stephen Sul
(74) *Attorney, Agent, or Firm* — Stephen T. Olson; Harness, Dickey & Pierce, P.L.C.

(57) ABSTRACT

A circuit breaker includes at least one electrical conductor for connection to an electrical circuit, a housing, a die, a punch movable relative to the housing to pass from a first position to a second position, and a pyrotechnical actuator to make the punch pass from the first position to the second position when ignited. The punch passes from the first position to the second position to cut the at least one electrical conductor into at least two distinct parts, and establish between the punch and the die, at least one electrical arc between the at least two distinct parts when the circuit breaker is connected to a live electrical circuit. When the punch is in the second position, at least one passage is between the at least two distinct part guides the at least one electrical arc between the distinct parts. A punch die unit includes at least one material designed to be withdrawn by (Continued)

ablation by the at least one electrical arc for generating gas suitable for increasing a voltage of the at least one electrical arc.

16 Claims, 2 Drawing Sheets

(58) Field of Classification Search
USPC .............. 337/30, 401, 108, 110, 273, 282; 439/258; 361/2, 12, 14, 134
See application file for complete search history.

(56) References Cited

U.S. PATENT DOCUMENTS

| | | | |
|---|---|---|---|
| 6,556,119 B1* | 4/2003 | Lell | ............... H01H 37/323 180/279 |
| 6,946,608 B2 | 9/2005 | Brede et al. | |
| 2005/0083165 A1* | 4/2005 | Tirmizi | ............... H01H 39/006 337/157 |
| 2013/0056344 A1 | 3/2013 | Borg | |
| 2013/0062313 A1* | 3/2013 | Sainz De La Maza Escobal ....... H01H 33/7069 218/22 |
| 2013/0126326 A1* | 5/2013 | Borg | ............... H01H 15/06 200/547 |
| 2013/0255464 A1* | 10/2013 | Ukon | ............... H01H 39/006 83/639.1 |
| 2014/0061011 A1* | 3/2014 | Nakamura | ............ H01H 39/006 200/61.08 |

OTHER PUBLICATIONS

U.S. Appl. No. 15/116,405, filed Aug. 3, 2016.

* cited by examiner

PYROTECHNIC CIRCUIT BREAKER

CROSS-REFERENCE TO RELATED APPLICATIONS

This application is a Continuation of International Application No. PCT/EP2015/052277, filed on Feb. 4, 2015, which claims the benefit and priority of French Patent Application No. 14 50853, filed on February 2014. The entire disclosures of the above applications are incorporated herein by reference.

FIELD

The present invention relates in a general manner to a circuit breaker comprising a pyrotechnical actuator intended to be mounted on an automobile, and in particular on an electrical vehicle.

BACKGROUND

It is necessary in such electrical vehicles to provide the ability to break the electrical lines connecting the energy storage devices (batteries, super-condensers, etc.) to the rest of the vehicle in order to make the electric vehicle safe, if an accident occurs for example. Due to the power involved and the characteristics of the electrical circuits, electrical arcs may occur during the cutting of electrical lines. These electrical arcs must be controlled. Circuit breakers are known in the prior art such as the one disclosed in the document EP0359467A2 and which propose specific arrangements for eliminating electrical arcs. Known circuit breakers may have a particular disadvantage of being bulky if used to cut electrical circuits with elevated voltages and/or currents.

SUMMARY

A goal of the present invention is to respond to the disadvantages of the above-cited documents of the prior art and in particular to provide a circuit breaker which is compact and which brings about a rapid break even if an electrical arc is formed.

To this end a first aspect of the invention relates to a circuit breaker including at least one electrical conductor designed to be connected to an electrical circuit, a housing, a die, a punch designed to be movable relative to the housing in order to pass from a first position to a second position, and a pyrotechnical actuator designed to move the punch from the first position to the second position when it is ignited. The punch and die are arranged to form a punch-die unit designed when the punch passes from the first position to the second position to break the at least one electrical conductor into at least two distinct parts, and bring about the establishing, between the punch and the die, of at least one electrical arc between the at least two distinct parts when the circuit breaker is connected to a live electrical circuit. The punch-die unit, when the punch is in the second position, allows at least one passage between the at least two distinct parts, which at least one passage is designed to guide the at least one electrical arc between the distinct parts. The punch-die unit includes at least one material designed to be withdrawn by ablation by the at least one electrical arc in order to generate gas suitable for increasing a voltage of the at least one electrical arc.

To this end a first aspect of the invention relates to a circuit breaker comprising:

at least one electrical conductor designed to be connected to an electrical circuit,
a housing,
a die,
a punch designed to be movable relative to the housing in order to pass from a first position to a second position,
a pyrotechnical actuator designed to make this punch pass from the first position to the second position when it is ignited,
which punch and die are arranged to form a punch-die unit designed to be able when the punch passes from the first position to the second position to:
break the at least one electrical conductor into at least two distinct parts, and
bring about the establishing, between the punch and the die, of at least one electrical arc between the at least two distinct parts when the circuit breaker is connected to a live electrical circuit,
characterised in that:
the punch-die unit, when the punch is in the second position, is designed to allow at least one passage between the at least two distinct parts, which at least one passage is designed to guide said at least one electrical arc between the distinct parts, and that The punch-die unit comprises at least one material designed to be withdrawn by ablation by said at least one electrical arc in order to generate gas suitable for increasing a voltage of said at least one electrical arc.

The circuit breaker according to the present invention controls electrical arcs created when the punch cuts the electrical current into two distinct parts. In fact, when the punch is in the second position, a passage is formed by the punch-die unit so that the electrical arc or arcs are guided through the passage, which guarantees their localisation and limits the risk of damaging the rest of the circuit breaker. Furthermore, the efficiency and the rapidity of the circuit breaking are improved by the material designed to be withdrawn by ablation which allows the voltage of the electrical arc to be increased once the pyrotechnical actuator has functioned. The circuit breaker will be efficient even for an elevated voltage at its terminals without increasing the gaps between the distinct parts, which improves the compactness. In fact, the material designed to be withdrawn by ablation is sublimated under the action of the flow of intense heat of the electrical arc, which modifies the composition of the plasma of the electrical arc and its conductivity, and allows the voltage of the electrical arc to be increased. Such electrical arcs can be created when the circuit breaker is connected to a live electrical circuit with voltages ranging from 0 V to 600 V and currents ranging from 0 A to 5,000 A on inductive charges ranging up to 2,500 µH (micro-Henries) for an intensity lower than 500 A and up to 150 µH for an intensity of 5,000 A. The circuit breaker of the invention allows the current to be cut in a reliable manner in less than 10 ms and even less than 5 ms in a definitive manner because the circuit breaker, which comprises a pyrotechnical actuator, can only be used once.

The passage can advantageously be formed between the punch and the die or in one of these parts.

Either the punch or the die is advantageously at least partially made of with the material designed to be withdrawn by ablation.

The material designed to be withdrawn by ablation is advantageously POM (polyoxymethylene or polyformaldehyde). According to this implementation, the material to be withdrawn by ablation forms a gaseous mixture, during the ablation. The gaseous mixture increases the voltage of the electrical arc because the POM presents a ratio of the number of carbon atoms to the number of oxygen atoms which is very low, close to 1. It is also possible to envision using ethylene polyterephthalate (PET), methyl polymethacrylate (PMMA), butylene polyterephthalate (PBT), polyether sulfone (PESU) or even polyamide 6-6 (PA6.6).

The at least one passage advantageously limits the material which can be withdrawn by ablation. The present implementation increases the efficiency of the circuit breaker because the material to be withdrawn by ablation by the electrical arc is located in its immediate vicinity. This location guarantees a rapid increasing of the voltage of the electrical arc due to the ablation of the material.

The at least one passage is a groove advantageously formed in the punch or and/or the die. It is possible to envisage a groove having the following dimensions: width ranging from 0.1 to 1 millimeter and depth ranging from 0.1 to 1 millimeter. Such a groove can be directly obtained by overmoulding if the dimensions are compatible with this technology and the injected material, or by re-machining.

When the punch is in the second position, the punch and the die are advantageously arranged with a tight adjustment with the exception of the at least one passage. According to the present implementation, the punch and the die have a tight adjustment in order to guarantee the irreversibility of the movement of the punch, which prevents on the one hand, any movement to the rear. On the other hand, this tight adjustment brings about a good sealing which forms a natural barrier against the passage of the electrical arc occurring somewhere other than in the passage. Consequently, the electrical arc is forced to pass through the passage, which remains free and at the level of which the punch and the die are not in a condition of a tight adjustment (since there is a clearance). It is possible to envisage providing a negative clearance from 0 to 0.3 millimeters between the punch and the die. Advantageously, each of these at least two distinct parts has a cut end separated from each other when the punch is in the second position.

The at least one passage is designed along the shortest path between the cut ends. Once the passage is formed along the shortest path between the cut ends, the path of the electrical arc will be favoured there since it is the path which requires the least energy.

The circuit breaker advantageously comprises an insert which comprises a guiding part for the punch and a reinforcement part for the die. The insert according to the present implementation is a single continuous and monoblock part which combines the function of guiding the punch and the function of reinforcing the die. The assembly can be made by overmoulding it on the electrical conductor, which minimizes the risk of an offset between the punch (guided by the guiding part of the insert) and the die (reinforced and therefore positioned by the reinforcement part).

The insert is advantageously made of polyamide 6-6 (PA6.6) charged with 30% of glass fibers.

The insert advantageously comprises a face designed to enter into a mechanical stop block between the punch, thus defining the second position.

The die is advantageously designed to be deformable in an elastic manner so as to guarantee a surface contact with the exception of the at least one passage with the punch when the punch is in the second position. The path of the electrical arc becomes all the more difficult elsewhere than in the passage, with a surface contact between the punch in the die.

The die advantageously comprises a recess designed between the die and the reinforcement part. This recess allows the die to move and/or be deformed under the action of the punch in order to align the die with the punch and ensure a good sealing between the punch and the die. It is possible to envisage that the recess is comprised between 0 and 2 millimeters, more particularly between 0 and 1 millimeter and very advantageously between 0 and 0.5 millimeters.

The die advantageously comprises a connection point with the reinforcement part which separates two recesses between the die and the reinforcement part. This implementation allows a pivoting of a die wall around the connection point, and not a crushing. This connection point can be placed facing the passage in such a manner as to control the section of the passage available for establishing the electrical arc.

The punch in the second position and the housing advantageously form at least one cutting chamber. The at least one cutting chamber comprises a vent hole to the outside of the circuit breaker and covered with a lid, designed to break beyond a predetermined pressure difference between the at least one cutting chamber and the outside of the circuit breaker. The present implementation proposes a safety valve in the cutting chamber calibrated to open at a given pressure. This allows an excess pressure to be evacuated without calling into question the integrity of the device if it functions beyond nominal conditions, while guaranteeing a tight system under nominal conditions.

The punch advantageously comprises two cutting edges in such a manner as to break the at least one electrical conductor into three distinct parts. This implementation forces the creation of two electrical arcs in series with one another which increases the breaking characteristics of the circuit breaker.

The circuit breaker advantageously comprises an insert which comprises a guiding part for the punch and a reinforcement part for the die. The insert according to the present implementation is a single continuous and monoblock part which combines the function of guiding the punch and the function of reinforcing the die. The assembly can be made by overmoulding it on the electrical conductor, which minimizes the risk of an offset between the punch (guided by the guiding part of the insert) and the die (reinforced and therefore positioned by the reinforcement part).

The die advantageously comprises a counterform designed between the two cutting edges in such a manner as to define two cutting chambers when the punch is in the second position.

The punch is advantageously designed to be movable along a predetermined axis of translation and the die is designed in a symmetrical manner relative to the axis of translation of the punch. The cutting forces are symmetrically distributed, which limits the risk of jamming.

The punch advantageously comprises at least one beveled cutting edge in order to cut the at least one electrical conductor progressively during its passage from the first to the second position. The cutting force in this implementation is lower than the one required by a straight cutting of the electrical conductor in which each is cut at a single time. This reduces the pressures to be implemented and also the bulk of the circuit breaker with this progressive beveled cut.

The beveled cut edge advantageously has an angle comprised between 90° (boundary excluded) and 75° relative to the direction of the movement of the punch.

The punch advantageously comprises a cutting edge in the shape of a "V" with the point of the "V" positioned in the middle of the cutting edge so that the point of the "V" finishes cutting the electrical conductor. This allows the establishing of the electrical arc in the middle of the device and a better balance of the forces involved. In this embodiment, the passage is arranged in the extension or facing the point of the "V".

A second aspect of the invention relates to a device for distributing current comprising at least one circuit breaker according to the first aspect of the invention.

A third aspect of the invention relates to an automobile comprising at least one circuit breaker according to the first aspect of the invention.

The automobile advantageously comprises means for storing electrical energy and an electrical propulsion device connected to the means for storing electrical energy by said at least one circuit breaker.

Another goal of the invention is to propose a pyrotechnical circuit breaker with a cutting chamber which is easy to manufacture and which brings about a seal during the operation in order to guarantee the confining of the gases heated by the electrical arc or arcs and to guarantee the non-polluting of the interior of the device by gases, humidity or dust coming from the outside of the device before its operation as an indication of protection IP67 according to the international norm CEI 60529en.

To this end, a fourth aspect of the invention relates to a pyrotechnical circuit breaker having a housing, at least one electrical conductor to be sectioned, at least one punch and at least one pyrotechnical actuator. The housing has at least one cutting chamber. The at least one electrical conductor traverses at least a part of the housing of the at least one cutting chamber. The at least one punch is arranged in the housing facing the at least one cutting chamber and can move between a first position and a second position. The punch is designed to section the at least one electrical conductor during its passage from the first to the second position. The at least one pyrotechnical actuator is designed to make the punch pass from the first position to the second position when activated. An insert is overmoulded on the at least one electrical conductor. The housing comprises a first housing part and a second housing part, with at least one sealing means between the insert and one of the first housing part and/or of the second housing part in order to ensure a sealing of this at least one cutting chamber.

The circuit breaker according to the above implementation ensures a good seal of the at least one cutting chamber with the sealing means. However, it remains easy to manufacture because the insert avoids having to provide sealing interfaces on the electrical conductor itself and bringing them back onto the insert. Therefore, these bearing surfaces can be continuous, without recess in order to facilitate the implantation of the sealing means such as an o-ring seal for example. In other words, the sealing is realized between only two parts facing each other at each time: between the first housing part and the insert on the one hand and between the second housing part and the insert on the other hand.

The at least one electrical conductor is advantageously arranged between the at least one cutting chamber and the punch when the punch is in the first position.

The first housing part and the second housing part are advantageously each in contact with the insert. This allows a good transmission of the strains between the different elements of the device and allows a good resistance of the assemblage to be ensured.

The insert is advantageously arranged between the first housing part and the second housing part and the circuit breaker comprises first sealing means between the insert and the first housing part and second sealing means between the insert and the second housing part.

The insert advantageously surrounds the at least one cutting chamber. This implementation guarantees that the sealing on the insert will be continuous. It is possible to envisage that the insert surrounds or circumscribes the at least one cutting chamber on both sides of the electrical conductor. In this implementation, the at least one cutting chamber can be defined in part by the insert and there is no need to provide a seal between the electrical conductor and the housing.

The first housing part and the second housing part are advantageously each arranged to be assembled on the insert along a direction of movement of the punch. It is quite possible to envision a male-female assemblage with the housing parts that slide on the insert during their assembly in order to come into the final assembled position. Therefore, the guiding of the punch is improved because the first part and the second part are positioned relative to the same piece, the insert.

The punch advantageously comprises a sealing zone in order to ensure a sealing between the punch and the insert and/or the housing. This seal can be provided between a combustion chamber of the circuit breaker and the at least one cutting chamber in order to avoid any influence of the combustion gases of the pyrotechnical actuator on the electrical arc or arcs.

The insert advantageously surrounds the at least one electrical conductor on at least two distinct zones. This implementation allows it to be guaranteed that no sealing function will be made on the electrical conductor itself. It is the overmoulding that makes this seal around the electrical conductor. In other words, no seal needs to be provided between the conductor and the first and the second housing parts.

The punch in the second position is advantageously arranged between the at least two distinct zones.

The insert advantageously comprises at least one overmoulded-on part arranged in a retention means of the at least one electrical conductor. The retention means can have the shape of one or several holes, cavities or cuts. This implementation allows the increasing of the unity of the insert with the electrical conductor and to therefore improve the sealing between the two parts.

The at least one sealing means advantageously comprises a seal. An o-ring seal can be envisaged.

The circuit breaker advantageously comprises two seals and the insert comprises two seal bearing surfaces, each facing a seal bearing surface of the first housing part and a seal bearing surface of the second housing part.

It is possible to provide one or more o-ring seals in order to realize the sealing means. In particular, it is possible to provide o-ring seals with a diameter comprised between 2 mm and 3 mm with a compression ranging from 0.5 to 0.8 mm. More precisely, it is possible to provide an o-ring seal with a diameter of 2.55 mm±0.15 mm with a compression of 0.7 mm±0.15 mm.

The circuit breaker advantageously comprises at least one overmoulded sealing lip.

The first housing part and the second housing part are advantageously welded. Each housing part can be welded on the insert.

BRIEF DESCRIPTION OF THE DRAWINGS

Other features and advantages of the present invention will appear more clearly from a reading of the detailed following an embodiment of the invention given in a non-limiting manner by way of example and illustrated by the attached drawings, in which:

FIG. 1 shows a perspective sectional view of a circuit breaker according to the present invention. A housing 1 is partially traversed by an electrical conductor 2 and the ends of the electrical conductor 2 form two connection terminals for the circuit breaker. The circuit breaker comprises a punch 4 and a die 3 which are arranged before the operation of the circuit breaker on both sides of the conductor 2 as shown in FIG. 1.

Figure 1:
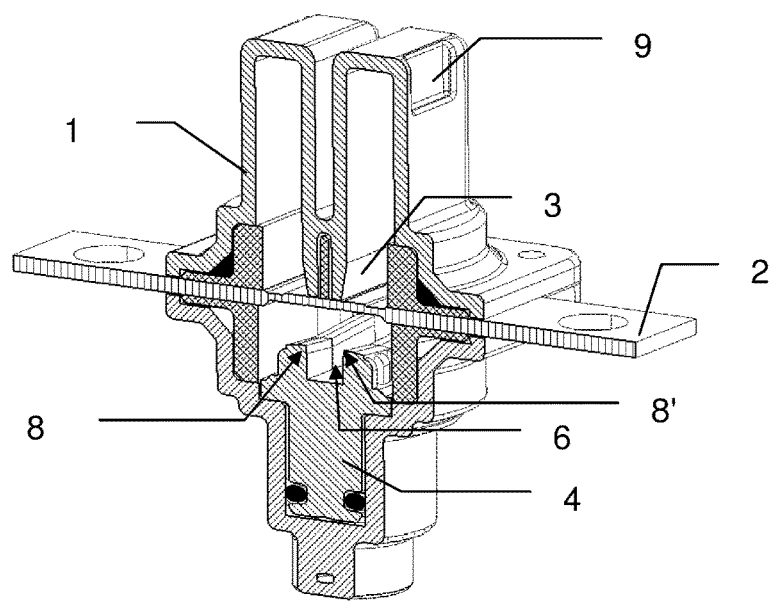
FIG. 1 shows a perspective sectional view of a pyrotechnical circuit breaker according to the present invention before operation.

The punch 4 comprises on its upper part facing the die 3 a groove limited by two cutting edges 8 and 8' and a passage 6 which is a vertical groove connecting the cutting edge 8 to the bottom of the groove of the punch 4. Another passage, which is not visible, connects the cutting edge 8' to the bottom of the groove of the punch 4. The utility of the passage 6 will be explained in particular in the paragraphs relating to FIG. 3.

The punch 4 is shown in FIG. 1 in a first position in which the electrical conductor 2 is intact. In order to cut the electrical conductor 2, the circuit breaker comprises a pyrotechnical actuator 5 (visible only in FIG. 2) which is designed to make the punch 4 pass into a second position such as shown in FIG. 2.

For example, the electrical conductor 2 can have a section of 2 mm×16 mm, a remaining thickness facing the punch 4 of 1.2 mm and the groove of the punch 4 has a width of 5 mm±1 mm.

Figure 2:
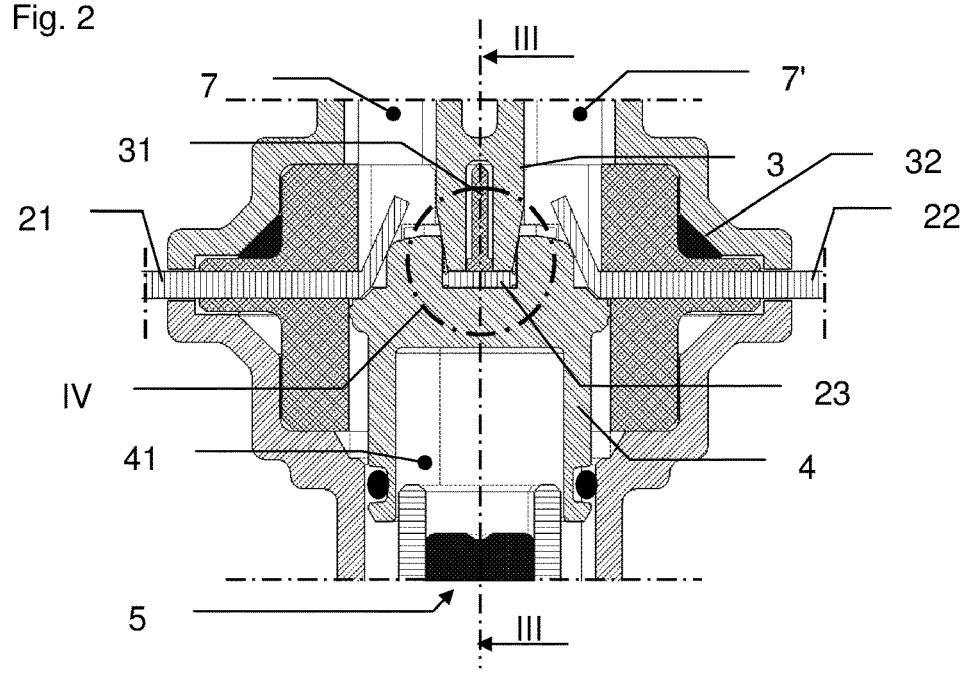
FIG. 2 shows a detail from the section of FIG. 1 after the functioning of the circuit breaker.

FIG. 2 shows the circuit breaker of FIG. 1 after functioning, that is, with the electrical conductor 2 separated into three distinct parts 21, 22 and 23. In order to obtain this result, the pyrotechnical actuator 5 (comprising an electropyrotechnical igniter, for example) located under the punch 4 was ignited and generated gases in such a manner as to pressurise a combustion chamber 41.

Figure 3:
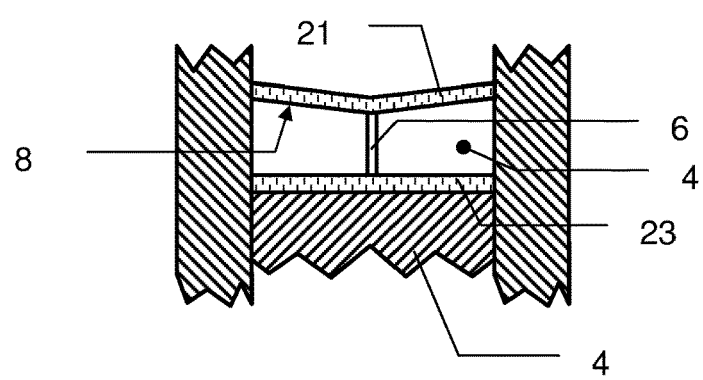
FIG. 3 shows a partial section of the circuit breaker along axis III-III from FIG. 2.

Under the effect of the gases and of their pressure in the combustion chamber 41, the punch 4 passed into a second position during a movement of translation, during which the conductor 2 was therefore separated into the three distinct parts 21, 22 and 23. As shown in FIG. 1 or 3, the cutting edges 8 and 8' are not rectilinear but in a V for progressively cutting the electrical conductor 2 with cutting forces less than those necessary for a simultaneous cutting of the entire section of the electrical conductor 2. In fact, with these cutting edges 8 and 8' which are beveled or not perpendicular to the direction of movement of the punch 4, the cut of the electrical conductor 2 is progressive.

It can be noted that the punch 4 comprises a groove in which an o-ring seal is mounted in order to guarantee a good sealing of the combustion chamber 41. This therefore achieves a cutting force of the punch 4 which is as elevated as possible and the gases of the pyrotechnical actuator 5 cannot enter into the cutting chambers 7 and 7', which limits the possible pollution of the plasma of the electrical arc by the gases of the pyrotechnical actuator 5.

With the punch 4 in the second position, the groove of the punch 4 is engaged in the die 3, and two distinct cutting chambers 7 and 7' have been formed. The part 21 of the electrical conductor 2 is therefore physically separated from the part 22 of the electrical conductor 2 by the punch 4. This separation limits the possibility of creating an electrical arc directly between the parts 21 and 22, even more so when in the second position, the punch 4 is in interference fit with the die 3.

This interference fit achieves several results. On the one hand the maintaining of the punch 4 in the second position is guaranteed by this interference fit. In this manner, separation of the cutting chambers 7 and 7' is guaranteed over time. It should be noted that the circuit breaker comprises a vent hole 9 with a lid (visible in FIG. 1) for each cutting chamber 7 and 7'. The vent holes 9 only open when the pressure in the respective cutting chamber 7 or 7' exceeds a threshold value.

On the other hand, the interference fit creates an elastic and/or plastic deformation of the punch and/or of the die 3 which will therefore be in surface contact with one another with a good sealing at the end between the cutting chambers 7 and 7'. This sealing allows the avoidance of the creation of electrical arcs between the cutting chambers 7 and 7', and the distinct parts 21, 22. However, as mentioned above, a passage 6 connects the cutting edges 8 and 8' of the punch 4 at the bottom of the groove of the punch 4, as shown in FIG. 3. This passage 6 allows the electrical arcs created during the cutting of the electrical conductor 2 to be located with certainty. A first arc can therefore be formed between the distinct part 21 and the distinct part 23 and a second one can be formed between the distinct part 23 and the distinct part 22.

The die can be deformed from 0 to 2 millimeters, preferably from 0 to 1 millimeter and even more preferably from 0 to 0.5 millimeters. To this end, a recess is formed between the die 3 and an insert 31 which authorises such movements and/or deformations.

Figure 4:
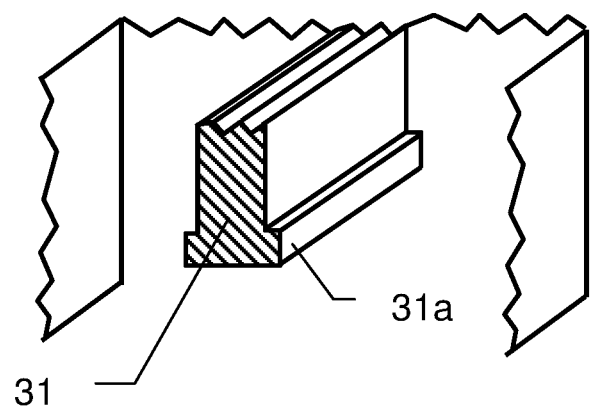
FIG. 4 is a perspective view of detail IV from FIG. 1.

As shown in FIG. 4, which is a perspective view of a part of the insert 31 of detail IV of FIG. 1, the insert 31 comprises a recess along the interface with the die 3. This recess is delimited by a portion 31 of the insert 31. The portion 31a forms a stop for the die 3, preventing it from re-tightening on itself all along the length of the conductor 2 at the moment of the cutting of the conductor 2 while leaving the possibility for the die 3 to be deformed above the portion 31a. This freedom of deformation allows a good surface contact to be guaranteed except for passage 6 between the punch 4 in the die 3 in the second position.

For example, the height of the portion 31a can be comprised between 0.5 mm and 5 mm and the recess can have a reduction of width of 0.5 mm to 1 mm.

The insert 31 can be made of polyamide 6.6 and has the main function of reinforcing the die 3. Therefore, as is shown, the insert 31 forms a bore in which the stamp 4 slides, which offers a direct positioning between the punch 4 in the die 3 since they are the same piece.

As FIG. 1 and FIG. 2 show, the housing 1 is formed by two distinct parts with a first housing part 1a and a second housing part 1b on each side of the overmolded insert 31. The two distinct parts 1a and 1b comprise two male parts which allow the reception of the upper housing and of the lower housing during the assembly.

As was seen above, the cutting chambers 7 and 7' and the punch 4 are defined in such a manner as to force the establishment of arcs in the passages, allowing only the latter as a communication path between the cutting chambers 7 and 7'. The overmoulded insert 31 as well as at least one o-ring seal 32 between the first housing part and the overmoulded insert 31 allow the confining of the gases naturally present in the cutting chambers 7 and 7' in the latter even if these confined gases are reheated by the electrical arcs.

Moreover, since the overmoulded insert 31 completely surrounds each of the distinct parts 21 and 22 as well as the cutting chambers 7 and 7', the sealing interface is then particularly easy to design with, as here, the o-ring seal 32 mounted in an inclined part of the first housing part and compressed by the overmoulded insert 31. Only two parts are in contact with the o-ring seal 32, which offers a simple mounting and designing.

For example, it can be provided that the o-ring seal 32 has a diameter of 2.55 mm, and is compressed by 0.7 mm.

Therefore, the gas leaks (and possibly that of the electrical arcs) are prevented up to pressures at least equal to 2 MPa, preferably 3 MPa, and even more preferably 5 MPa in the cutting chambers 7 and 7'.

Moreover, the overmoulded insert 31 coupled by sealing creates a seal with the level IP67 as defined in the standards DIN40050, CEI 60529 or BS 5490. This allows to avoid any intrusion of a body into the circuit breaker which could alter its functioning. This allows the circuit breaker to be able to be positioned at a greater number of locations in the vehicle.

It can also be possible to provide a second o-ring seal between the second housing part and the overmoulded insert 31 as can be seen in FIGS. 1 and 2.

Therefore, the seal of the device is always ensured at the interface between two parts and never at the interface of three parts as would be the case if the device was not provided with the overmoulded insert 31. In other words, this aspect of the invention proposes an insert overmoulded on the electrical conductor in order to have a seal ensured solely between the insert and one of the housing parts at a time.

FIG. 3 shows a partial cross-section of the circuit breaker along axis III-III in FIG. 2 without the die 3 (not shown for reasons of clarity). The part 21 of the electrical conductor 2 was moved upward by the cutting edge 8 and folded in a V, on account of the V shape of the cutting edge 8 of the punch 4. The part 23 of the electrical conductor 2 remained at the bottom of the groove of the punch 4 and FIG. 3 shows the passage 6 which connects the cutting edge 8 to the bottom of the groove of the punch 4.

Because of the electrical characteristics of the circuit for which the circuit breaker is provided (with voltages ranging from 0 V to 600 V and currents ranging from 0 A to 5,000 A on inductive charges ranging up to 2,500 µH (micro-Henries) for an intensity lower than 500 A and up to 150 µH for an intensity of 5,000 A), an electrical arc will be formed when the punch 4 passes from the first position to the second position and cuts the electrical conductor 2. This electrical arc, when the punch 4 is in the second position, will naturally travel through the passage 6 for the reasons given below.

At first, the punch 4 and the die 3 are in an interference fit and only the passage 6 is a free passage between the cutting chamber 7 and the bottom of the groove of the punch 4. Finally, the passage 6 is arranged at the shortest passage between the part 21 of the electrical conductor 2 and the part 23 of the electrical conductor 2. In fact, the passage 6 empties in its upper part at the level of the lower part of the V of the part 21 of the electrical conductor 2. Because of the cutting into three distinct parts, two electrical parts are created in series, which increases the total voltage of the arcs and therefore the voltage at the terminals of the circuit breaker, which allows the value of the current in the electrical circuit to be canceled.

Due to the passage 6 the electrical arc is localised and must pass through the passage 6. The invention proposes in addition to increase the voltage of the electrical arc when the latter has been formed. To this end a material designed to be withdrawn by ablation is supplied in the vicinity of the passage 6 since the electrical arc will be present there. This material designed to be withdrawn (or eroded) by ablation will be sublimated and/or vaporised by the strong flow of heat imposed by the electrical arc, which modifies the composition of the plasma of the electrical arc and therefore its conductivity. By selecting the material to be withdrawn by ablation among the plastics, the voltage on the terminals of the arc is increased and good results are obtained with POM called polyoxymethylene (or polyformaldehyde) because this material has a low ratio of carbon atoms relative to the oxygen atoms.

Finally, it can be noted that the size of the passage 6 can condition the quantity of material withdrawn by ablation and that the lower the size of the groove forming the passage 6 is, the greater the erosion will be. Good results are obtained with a groove with a width ranging from 0.1 to 1 millimeter and a depth ranging from 0.1 to 1 millimeter.

It is understood that various modifications and/or improvements obvious to a person skilled in the art can be added to the different embodiments of the invention described in the present description without leaving the scope of the invention defined by the attached claims.

The invention claimed is:

1. A circuit breaker comprising:
   at least one electrical conductor for connection to an electrical circuit;
   a housing;
   a die;
   a punch movable relative to the housing to pass from a first position to a second position;
   a pyrotechnical actuator to move the punch from the first position to the second position when ignited;
   wherein the punch and die are arranged to form a punch-die unit designed, when the punch passes from the first position to the second position to:
   break the at least one electrical conductor into at least two distinct parts, and establishing, between the punch and the die, at least one electrical arc between the at least two distinct parts when the circuit breaker is connected to the electrical circuit and the electrical circuit is a live electrical circuit, and
   wherein the punch-die unit, when the punch is in the second position, allows at least one passage between the at least two distinct parts, the at least one passage designed to guide the at least one electrical arc between the at least two distinct parts, and
   wherein at least one of the punch and the die is at least partially formed of a material designed to be withdrawn by ablation by the at least one electrical arc for generating gas suitable for increasing a voltage of the at least one electrical arc,
   wherein the punch includes two cutting edges to break the at least one electrical conductor into three distinct parts, and
   wherein the die includes two cutting chambers when the punch is in the second position.

2. The circuit breaker according to claim 1, wherein the at least one passage is at least partially limited by the material withdrawable by ablation.

3. The circuit breaker according to claim 1, wherein the at least one passage is a groove formed in the punch or and/or the die.

4. The circuit breaker according claim 1, wherein when the punch is in the second position, the punch and the die are arranged with a tight tolerance with exception of the at least one passage.

5. The circuit breaker according to claim 4, wherein:
   each of the at least two distinct parts has a cut end separated from each other when the punch is in the second position, and
   the at least one passage is designed over the shortest path between the cut ends.

6. The circuit breaker according to claim 1, wherein the die is deformable in an elastic manner so to guarantee a surface contact with the exception of the at least one passage with the punch when the punch is in the second position.

7. The circuit breaker according to claim 1, wherein the punch in the second position and the housing form at least one cutting chamber and the at least one cutting chamber comprises a vent hole to the outside of the circuit breaker and with a lid breakable beyond a predetermined pressure difference between the at least one cutting chamber and an outside of the circuit breaker.

8. The circuit breaker according to claim 1, wherein the punch is moveable along a predetermined axis of translation and the die is in a symmetrical manner relative to an axis of translation of the punch.

9. The circuit breaker according to claim 1, wherein the punch includes at least one bevelled cutting edge to cut the at least one electrical conductor progressively during movement from the first position to the second position.

10. The circuit breaker according to claim 1, wherein the material designed to be withdrawn by ablation is polyoxymethylene (POM).

11. The circuit breaker according to claim 1, in combination with a device for distributing current.

12. The circuit breaker according to claim 1, in combination with an automobile.

13. The automobile according to claim 12, further comprising means for storing electrical energy and an electrical propulsion device connected to the means for storing electrical energy by the at least one circuit breaker.

14. The circuit breaker according to claim 1, wherein the at least one passage is at least partially limited by the material withdrawable by ablation.

15. The circuit breaker according to claim 1, wherein the at least one passage is a groove formed in the punch or and/or the die.

16. The circuit breaker according to claim 1, wherein the die is deformable in an elastic manner so to guarantee a surface contact with exception of the at least one passage with the punch when the punch is in the second position.

* * * * *